United States Patent [19]

Okasako et al.

[11] Patent Number: 4,981,115
[45] Date of Patent: Jan. 1, 1991

[54] INTAKE SYSTEM FOR V-TYPE ENGINE

[75] Inventors: Yasuhiro Okasako, Hiroshima; Fusatoshi Tanaka, Higashi-Hiroshima; Hideo Nakayama, Hiroshima; Takashige Ishikawa, Hiroshima; Kazumi Okamura, Higashi-Hiroshima; Hiroyuki Matsumoto, Hiroshima; Tsuyoshi Tsuchida, Iwakuni, all of Japan

[73] Assignee: Mazda Motor Corporation, Hiroshima, Japan

[21] Appl. No.: 386,587

[22] Filed: Jul. 31, 1989

[30] Foreign Application Priority Data

Jul. 29, 1988 [JP] Japan ................. 63-191336
Sep. 27, 1988 [JP] Japan ................. 63-243276
Oct. 7, 1988 [JP] Japan ............. 63-132190[U]

[51] Int. Cl.⁵ .......................................... F02M 35/10
[52] U.S. Cl. ............................................... 123/52 MV
[58] Field of Search ......... 123/52 M, 52 MB, 52 MC, 123/52 MV

[56] References Cited

U.S. PATENT DOCUMENTS

| | | | |
|---|---|---|---|
| 2,845,912 | 8/1958 | Bird | 123/52 M V |
| 4,615,324 | 10/1986 | Choushi et al. | 123/52 MV |
| 4,649,871 | 3/1987 | Hatamura et al. | 123/52 MC |
| 4,708,097 | 11/1987 | Hatamura et al. | 123/52 M |
| 4,766,853 | 8/1988 | Iwanami | 123/52 M |
| 4,829,942 | 5/1989 | Ampferer | 123/52 MV |

FOREIGN PATENT DOCUMENTS 0266158 11/1988 Japan ................. 123/52 M

Primary Examiner—David A. Okonsky
Attorney, Agent, or Firm—Wenderoth, Lind & Ponack

[57] ABSTRACT

Each cylinder bank of a V-type engine is provided with a plurality of cylinders which are not in sequence in firing order. A collecting intake passage is connected to each of the cylinders of both banks by way of independent intake passages which pass between the two banks and have the same effective channel length, and each of the independent intake passages is arranged so that it extends substantially perpendicularly and upwardly from a cylinder. Both collecting intake passages are arranged above one of the cylinder banks, and the collecting intake passage which is connected to a cylinder of the other cylinder bank is arranged on the independent intake passages connected to the other collecting intake passage. By doing so, overlapping of both collecting intake passages can be avoided and thus the height of the intake system can be reduced. The independent intake passages and the collecting intake passage which overlaps the former have a common wall. In one embodiment, each of the collecting intake passages is formed integrally with a high speed intake passage and a low speed intake passage. The vertical positions of the high speed intake passages for each bank are varied. The high speed rear side intake passage is connected to the underside of the low speed rear side intake passage. The low speed and high speed front side intake passages are connected to each other by way of a common side wall.

26 Claims, 8 Drawing Sheets

INTAKE SYSTEM FOR V-TYPE ENGINE

BACKGROUND OF THE INVENTION

1. Field of the Invention

This invention relates to an intake system for a V-type engine, and particularly to an improvement in the arrangement of a collecting intake passage formed in an intake system for supercharging by the so-called dynamic supercharging effect (an inertia effect coupled with a resonance effect) of intake air.

2. Description of Prior Art

The technology of increasing the charging efficiency of intake air by supercharging intake air supplied to cylinders of an engine by utilizing an inertia effect and a resonance effect has been well known. In the case of supercharging by the inertia effect of intake air, a negative pressure wave of intake air is generated at an intake port at an initial stage of the air intake process for each cylinder as a corresponding intake valve is opened, and the intake air negative pressure wave is transmitted at a sonic speed toward the upstream side of an independent intake passage connected to an intake port, such that the negative pressure wave is reversed, namely, is converted into a positive pressure wave, at a designated volume part. Then this positive pressure wave is transmitted at a sonic speed toward the downstream side through the same passage such that it arrives at the intake port of the same cylinder at the end of a taking-in process or immediately before closing of the intake valve. This positive pressure wave causes intake air to be introduced into the combustion chamber of the cylinder in a manner which results in enhanced charging efficiency.

On the other hand, in the case where supercharging is effected by a resonance effect of intake air, plural cylinders of an engine are divided into plural groups. Each group comprises cylinders which are not sequentially timed in the ignition process and have independent intake passages which converge into one collecting intake passage (resonant intake passage). A pressure reversing part is provided at the designated position of this collecting intake passage. The pressure wave of intake air which is transmitted reciprocatively between the pressure reversing part and each cylinder is resonated in the collecting intake passage. This resonance generates a resonant pressure wave having an increased amplitude due to pressure vibrations generated individually at each cylinder. The resonant pressure wave causes intake air to be introduced into the combustion chamber of the cylinder in a manner which results in improved charging efficiency.

In a conventional V-type engine having a pair of opposite cylinder banks as shown by Laid Open Japanese Patent Application No. 56-52522, for example, cylinders of each bank are communicated with respective independent intake passages. An upstream end of this independent intake passage is connected to a pair of collecting intake passages, end portions of which are connected with each other to form a loop passage. This loop passage (two collecting intake passages) is arranged between the two cylinder banks.

As mentioned above, in such an intake system for a V-type engine a resonance state is generated between the individual cylinders of each bank. Supercharging is thus effected by the positive pressure wave of intake air generated by this resonance. That is by grouping cylinders which are not sequentially timed with respect to the air taking-in process for each bank, a pressure wave which is transmitted reciprocatively between a certain cylinder and a pressure reversing part (or joining part) of the collecting intake passage is resonated in the collecting intake passage to generate a resonance pressure wave. This resonance pressure wave results in supercharging because it causes the intake air to act on the air taking-in process at the other cylinder.

By increasing the length of each independent intake passage, supercharging can be provided both by the inertia effect of intake air during high speed operation of the engine and by the resonance effect.

However, in the case where a pair of collecting intake passages are arranged between two cylinder banks as mentioned above, a layout of long independent intake passage becomes complicated. Moreover, when the lengths of the independent intake passages are increased, the height of the collecting intake passage must also increase. Therefore, when this is applied to an engine for a passenger car, the engine compartment of the car increases in height.

As shown in U.S. Pat. No. 4,708,097, it is possible to arrange both of the collecting intake passages on one of the cylinder banks of the engine in such a fashion that one is mounted on the other and they share a common side wall. Such arrangement, however, makes it difficult to make the lengths equal for all of the independent intake passages corresponding to the cylinders of both banks. It is also difficult to make the independent intake passages of both banks substantially the same in shape (i.e. with respect to the degree of bending or radius of curvature) and there is a concern that the degree of bending of an independent intake passage communicating with a cylinder of one cylinder bank on the side where both collecting intake passages are arranged will be greater (i.e. the radius of curvature will be smaller) than that of an independent intake passage communicating with a cylinder of the other cylinder bank. Such differences in degrees of bending result in different intake resistances between the two cylinder banks, thereby causing irregular charging efficiencies for the intake air to the cylinders of the two cylinder banks.

In the above intake system intended to effect supercharging by the resonance effect of the intake air, the distance by which the pressure wave is transmitted is greater than the distance by which the pressure wave is transmitted when supercharging is effected by the inertia effect. Therefore, a good resonance effect can be obtained in the low/middle range of engine speeds in which the intake valve is opened for relatively long periods of time. This engine speed range is relatively limited and corresponds to the length of the intake passages. Accordingly, the resonance is not advantageous when supercharging will be needed over a wide range of engine speeds.

In order to overcome the above disadvantages, there has been suggested an intake system in which a resonance intake passage is composed of two kinds of passages, a first intake passage for high engine speeds with a relatively short intake passage (or channel) and a second intake passage for low engine speeds with a relatively long intake channel (as disclosed by Laid Open Japanese Patent Application No. 62-210219). In this manner, a good resonance effect can be obtained throughout a wide range of engine speeds by utilizing the first intake passage for high engine speeds and the second intake passage for low engine speeds.

However, since the above intake system is provided with two kinds of intake passages, i.e. intake passages for low and high engine speeds, the intake system is rather large in size and it becomes difficult to design a motor car with a compact engine compartment. In the V-type engine, the intake system of each cylinder bank is usually arranged above the cylinder bank so that the lengths of the independent intake passages to the cylinders of both banks can be made equal. This makes it difficult to arrange the intake passages so that they do not interfere with the engine compartment hood. This is especially true for transversely mounted V-type engines (i.e. in which the engine is disposed transversely with respect to the longitudinal direction of the vehicle), because having an intake system arranged above the forwardmost cylinder bank makes it difficult to design the engine compartment hood so that it is lower in the front than in the rear.

The present invention has been made with the above points in mind and has for its object, in the case where both collecting intake passages are mounted to each other and share a common wall to reduce and make substantially equal the degrees of bending of the independent intake passages of both banks so as to equalize the intake charging efficiencies of the cylinders of both banks and to generally improve the shape of each independent intake passage and its arrangement relative to the collecting intake passage.

Another object of the present invention is to make more compact the intake system of an engine provided with different intake passages for use at high and low engine speeds so as to facilitate vehicle design even for a vehicle with a low engine compartment hood.

SUMMARY OF THE INVENTION

In order to attain the above objects, in a V-type engine having a pair of opposing cylinder banks (first and second banks), each of which include a plurality of cylinders which are not in sequence in the air intake process (or in the firing order), a pair of collecting intake passages (first and second collecting intake passages) are connected to cylinders of both banks by way of independent intake passages (first and second sets of independent intake passages) disposed between the two banks. The lengths of the independent intake passages are equal to one another. Each of the above independent intake passage is shaped such that it extends substantially perpendicularly and upwardly from the corresponding cylinder. The first collecting intake passages is located above the first bank and cylinders of the first bank are in communication with the first collecting intake passage. The second collecting intake passage is located above the set of independent intake passages connected to the first collecting intake passage.

The V-type engine is preferably mounted transversely with respect to the longitudinal direction of the vehicle body such that the pair of banks are arranged such that both are opposed to each other in the longitudinal direction of the vehicle. The first bank, above which the first collecting intake passage is disposed, is located rearwardly of the second bank in the longitudinal direction of the vehicle body.

In order to reduce the height of the intake system and the engine as a whole, that is, to make the engine compact in size and to increase the strength of the intake system, independent intake pipes which form the independent intake passages connected to the first collecting intake passage are formed integrally with an intake air collecting part which forms the second collecting intake passage, with a common partition wall therebetween.

Generally, the cylinders of the first bank are shifted with respect to the cylinders of the second bank in their lengthwise direction. In order to equalize the distances from the position of a throttle valve to both collecting intake passages and to improve dividing of intake air to the cylinders of both banks while having such banks shifted with respect to one another, the first collecting intake passage is shifted with respect to the second collecting intake passage in the same direction in which the second bank is shifted with respect to the first bank.

In order to improve serviceability of the spark plugs by enlarging the space around the plug holes of the cylinder heads of the first bank, the first set of independent intake passages extend perpendicularly with respect to bath banks. Additionally, they are bent at an intermediate part, in the same direction in which the first bank is shifted with respect to the second bank.

In order to increase rigidity between the two banks and to restrict deformation thereof due to thermal expansion variations between the two banks during running of the engine, the cylinder heads of both banks are mutually integrally connected by a spacer.

In this case, in order to avoid interference between fitting bolts for fastening of the spacers and the second independent intake passages, the second independent intake passages extend perpendicularly from the second collecting intake passage and are bent at their intermediate parts in the same direction in which the second bank is shifted with respect to the first bank.

When an intake system is attached to an engine, assembly is easier if parts composing the intake system, such as intake pipes, can be attached from directly above. Therefore, the top of the spacer is made planar.

In some prior art arrangements, the construction for returning part of the exhaust gas from the engine and blow-by gas from a crank room to a surge tank, is such that oil in the blow-by gas and water in the return exhaust gas tend to collect in the surge tank. This raises a problem. In order to solve this problem, in the present invention an exhaust return passage for returning a part of the exhaust gas from the engine to the intake system and a blow-by gas passage for supplying blow-by gas from the crank room of the engine to the intake system are formed through the spacer. The downstream ends of these passages open into the independent intake passages By this construction, dividing of both gases to the cylinders is improved.

As blow-by gas in the blow-by gas passage contains engine oil, it is desired to prevent this oil from flowing back to the exhaust return passage. For this purpose, the blow-by gas passage is arranged below the exhaust return passage in the spacer.

In the case where fuel is jet-supplied to the cylinders of each bank by injectors, only one fuel dispensing pipe for supplying fuel to the injectors is arranged between the banks. This arrangement reduces the number of pipes so that space the between the banks can be utilized effectively.

In order to enhance a cooling effect for the injectors which jet-supply fuel to the independent intake passages of the cylinders, the injectors are arranged between the two banks below the independent intake pipes forming the independent intake passages. Because only one of the independent intake pipes is disposed between the banks, as compared with the case where plural independent intake pipes are all arranged between the banks, each injector is better exposed to the wind during running of the car and the radiation of heat therefrom is increased. As a result, when the engine is started in an already warmed condition, evaporation of the fuel in the injectors is reduced and the starting ability of the engine is improved.

The intake ports of the cylinders are bent upwardly as they part from the respective cylinders and the injectors are arranged along extension lines from the cylinder side portions of the intake ports. By this construction, fuel jetted from the injectors can hit the rear of umbrella parts of the intake valves of the respective cylinders such that the distance between the injectors and the umbrella parts of the intake valve can be increased. Thus, evaporation/atomization of the jetted fuel can be promoted.

The second set of independent intake passages extends perpendicularly from the second collecting intake passage and are bent at their intermediate parts in the same direction in which the second bank is shifted with respect to the first bank, and the first set of independent intake passages corresponding to the first bank extend in a straight line, when viewed from above. By this construction, the first set of independent intake passages have a relatively large degree of bending in the direction along a vertical plane and are rectilinear when viewed from above. The second set of independent intake passages have a relatively small degree of bending in the direction along a vertical plane, and bend when viewed from above. In this manner, the irregularity of intake air resistance to cylinders of both banks can be reduced by equalizing the intake air resistance in both sets of independent passages.

In order to attain another object of the present invention, regarding the transmission of pressure waves, each collecting intake passage is formed by a high speed intake passage with a relatively short intake channel length and a low speed intake passage, whose downstream end is connected to the high speed intake passage, with a relatively long intake channel length. The high speed passage and the low speed intake passage are formed integrally.

In the intake system for the V-type engine equipped with high and low speed intake passages, in order to reduce the height of the intake system and to utilize the space effectively, the collecting intake passage for each of the banks is formed by high and low speed intake passages as mentioned above. Furthermore, both high speed intake passages and both low speed intake passages are arranged above the first bank and the low speed intake passages connected to the high speed intake passages for the first bank are arranged above the high speed intake passages. On the other hand, the low speed intake passages connected to the high speed intake passages for the second bank are arranged at the side portion of the high speed intake passages.

In order to provide for supercharging of intake air by an inertia effect and/or a resonance effect in a wide range of engine speeds by providing for changeover from the high speed intake passage to the low speed intake passage, a collecting part is provided at one side of the first bank and is connected to the upstream ends of both collecting intake passages, and a communicating passage is provided at the other side of the first bank for communicating the downstream ends of the collecting intake passages with each other. A throttle valve is provided at a common intake passage on the upstream side of the collecting part and a switch valve is provided for opening and shutting the communicating passage. Furthermore, a switch valve is provided for opening and shutting the high speed intake passage at the upstream end of the high speed intake passage in each bank. these two kinds of switch valve are so designed that both of them are opened at high engine speeds. At medium engine speeds the switchover valve for the communicating passage is shut and the switchover valve for the high speed intake passage is opened. At low engine speeds both of them are shut.

In this case, in order to obtain a pressure wave reversing part in the low speed intake passage so as to provide a resonance effect even when the switch valve for the high speed intake passage is shut, a collecting part for collecting the upstream ends of both collecting intake passages is provided at one side of the first bank. Additionally, the upstream ends of the low speed intake passages are communicated with the collecting part at the downstream side of the upstream end of the high speed intake passages. Communicating holes for communicating the upstream ends of the low speed intake passages with the collecting part are arranged at an upper side of communicating holes for communicating the upstream ends of the high speed intake passages with the collecting part.

The upstream ends of both collecting intake passages are connected to the common intake passage for introducing intake air into the intake passages. The common intake passage is formed such that it such that it gradually turns forwardly towards its upstream side with the collecting intake passage. By this construction, the intake quantity at the outside of the common intake passage is made larger than that at the inside due to inertia and centrifugal force of the intake air flowing in the common intake passage. Because of this difference in the intake quantity, intake air is supplied in greater amounts to the first independent intake passage which has a large degree of bending and thus creates more resistance to intake air than the second independent intake passage which has a smaller degree of bending. Thus, the intake air resistance is effectively equalized in the two independent intake passages so as to reduce the irregularity of intake air resistance to the cylinders of the two banks.

BRIEF DESCRIPTION OF THE DRAWINGS

The nature and advantages of the present invention will be understood more clearly from the following detailed description of the present invention made with reference to the accompanying drawings, in which.

DETAILED DESCRIPTION OF THE INVENTION

Embodiments of the present invention will now be described below with reference to the drawings.

Figure 1:
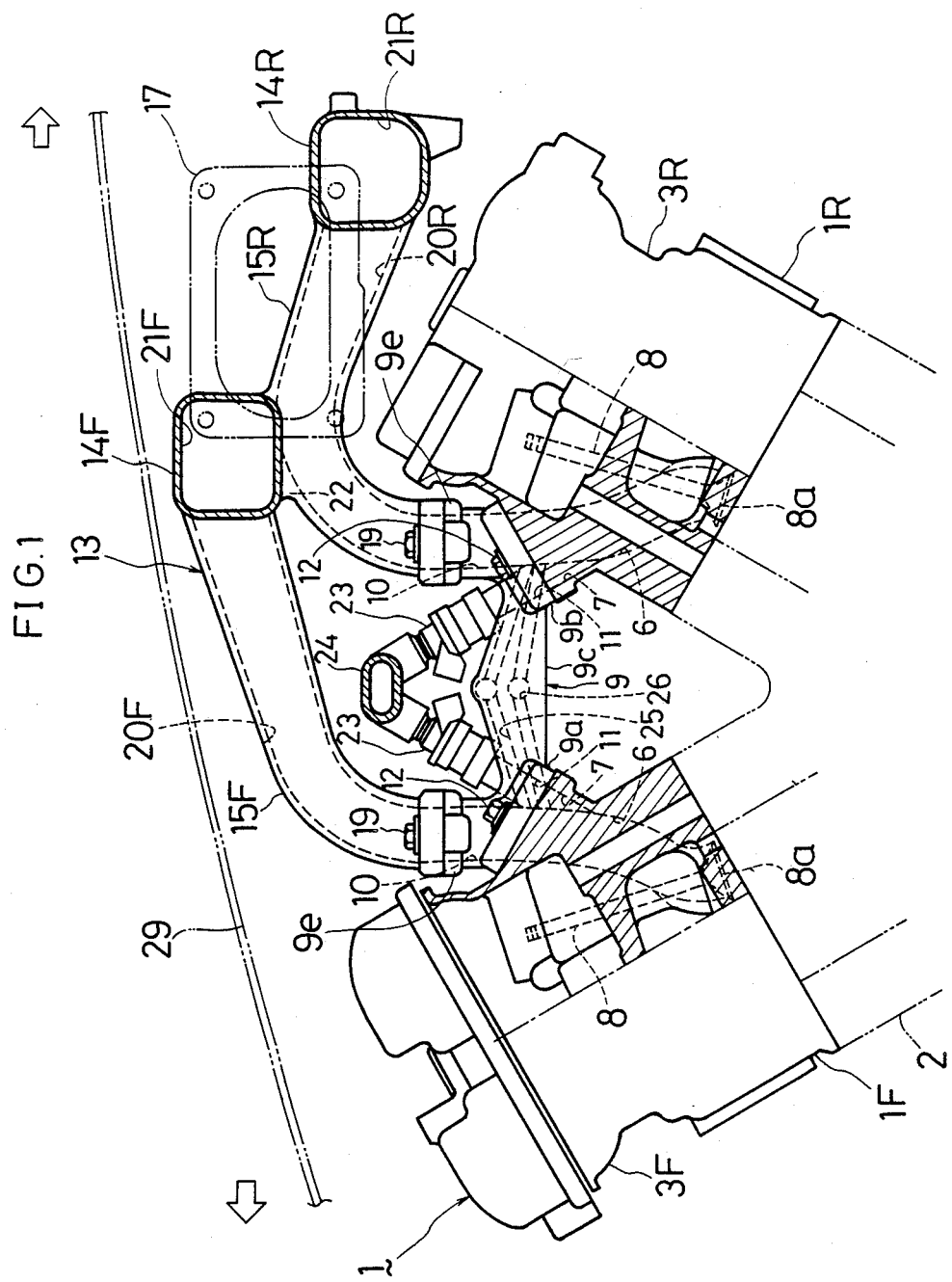
FIG. 1 shows a cross section, taken along the line I—I in FIG. 2.
Figure 2:
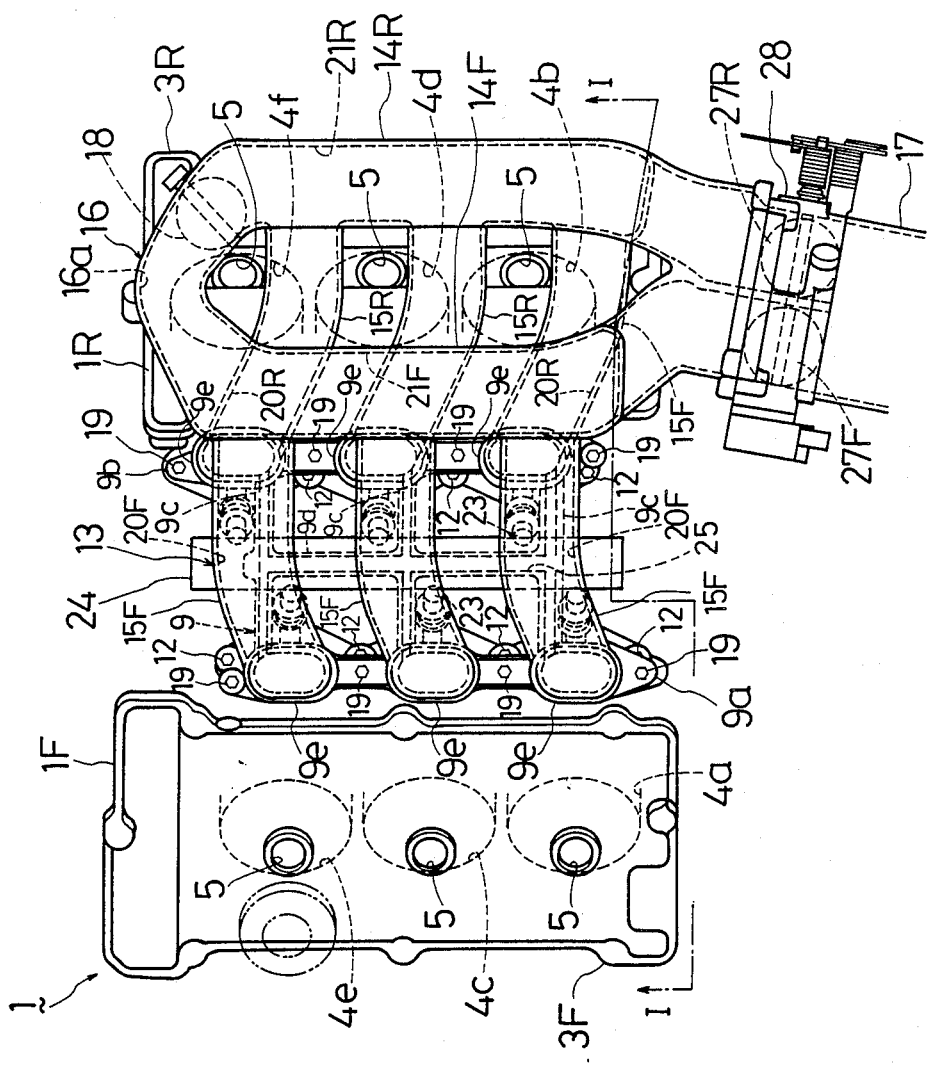
FIG. 2 is a plan view showing a main part of a V-type engine, according to a first embodiment of the present invention, with a head cover removed.

FIG. 1 and FIG. 2 show a first embodiment in which the present invention is applied to a laterally disposed (transversely mounted) V-type engine of a passenger car. In the drawings, reference numeral 1 designates a DOHC V-type engine having a front side cylinder bank 1F and a rear side cylinder bank 1R which are opposite to each other in the longitudinal direction of the vehicle body. This engine 1 is provided with a cylinder block 2 which has a V-shaped cross-section and cylinder heads 3F, 3R connected to surfaces of the banks 1F, 1R of the cylinder block 2. The front side bank 1F carries the first cylinder 4a, the third cylinder 4c and the fifth cylinder 4e and the rear side bank 1R carries the second cylinder 4b, the fourth cylinder 4d and the sixth cylinder 4f. These six cylinders 4a–4f are fired in a firing order corresponding to the cylinder numbers (i.e. in sequence from the first cylinder 4a to the sixth cylinder 4f).

In each cylinder head are formed three plug holes 5, for receiving spark plugs (not shown in the drawing) for igniting intake air in combustion chambers of the cylinders 4a–4f which open at positions substantially on the center line of the cylinders. Formed in each of the cylinder heads 3F, 3R are three intake ports 6, each of which opens at one end into a combustion chamber of one of the cylinders 4a–4f, and three fuel jetting ports 7 which communicate respectively with each intake port 6. The other end (upper end) of each of the intake ports 6 opens (in elliptical shape) at the side of each cylinder head 3F, 3R which faces the opposing cylinder bank. Each fuel jetting port 7 opens at one side of the upper end opening of the intake port 6 as it overlaps the intake port 6. Intake valves 8 are provided for opening and shutting the ends of respective intake ports 6 opening into the cylinder combustion chambers. The intake valves 8, together with respective exhaust valves (not shown in the drawing), are opened and shut by a DOHC type valve operating mechanism.

A spacer 9 is disposed between both cylinder heads 3F, 3R in such a fashion that it joins both banks 1F, 1R. This spacer 9 is integrally formed with a pair of (first and second) fitting parts 9a, 9b fastened by bolts 12, three lateral ribs 9c to connect both of the fitting parts 9a, 9b and a longitudinally extending vertical rib 9d to interconnect said lateral ribs 9c at central portions thereof. Three port forming parts 9e are formed at each fitting part 9a, 9b at locations corresponding to the upper end openings of each of the intake ports 6. Both fitting parts 9a, 9b are connected with each other by way of the lateral ribs 9c. A port 10 (which is elliptical in cross-section) is formed though each of the port forming parts 9e and communicates concentrically with one of the fuel jetting ports 7. The upper surface of each port forming part 9e is planar.

Reference numeral 13 designates an intake manifold formed integrally by casting or the like. This intake manifold 13 carries a front side surge tank 14F and a rear side surge tank 14R which act as intake collecting parts arranged in parallel with each other in a direction along the banks 1F, 1R (in vertical direction in FIG. 2), three front side independent intake pipes 15F which are connected integrally with the front side (the side opposite the rear side surge tank 14F) of the front side surge tank 14F and extend in parallel with one another and three rear side independent intake pipes 15R which are connected integrally with the front side (the side facing the front side surge tank 14F) of the rear side surge tank 14R. The downstream ends of both of the surge tanks 14F, 14R are connected with each other by a communicating passage 16a in a communicating pipe 16 and a switchover valve 18 is disposed in the passage 16a. The upstream ends of the surge tanks 14F, 14R are connected with each other by a collecting pipe 17. This collecting pipe 17 is connected to both surge tanks 14F, 14R by way of a throttle body 28 having throttle valves 27F, 27R therein. Both of the throttle valves 27F, 27R are provided on the same axis and open and shut simultaneously.

The lower ends of said front side independent intake pipes 15F, 15R are fastened to the upper surface of the corresponding port forming parts 9e of the first fitting part 9a of the spacer 9 by the fitting bolts 19, and the lower ends of the rear side independent intake pipes 15R are fastened to the upper surfaces of the corresponding port forming parts 9e of the second fitting part 9b of the spacer 9 by the fitting bolts 19.

With the above arrangement, three front side independent intake passages 20F located between both banks 1F, 1R and communicating respectively with each cylinder 4a, 4c, 4e of the front side bank 1F are formed respectively by the intake ports 6 of the cylinder head 3F in the front side bank 1F, the ports 10 of the first fitting part 9a of the spacer 9 and the front side independent intake pipes 15F. A front side collecting intake passage 21F, to which the upstream ends of the front side independent intake passages 20F are connected, is formed by the front side surge tank 14F. Similarly, three rear side independent intake passages 20R located between both banks 1F, 1R and communicating respectively with each cylinder 4b, 4d, 4f of the rear side bank 1R are formed respectively by the intake ports 6 of the cylinder head 3R in the rear side bank 1R, the ports 10 of the second fitting part 9b of the spacer 9 and the rear side independent intake pipes 15R. Also, a rear side collecting intake passage 21R, to which the upstream ends of the rear side independent intake passages 20R are connected, is formed by the rear side surge tank 14R. The lengths of the front side and the rear side independent intake passages 20F, 20R are made equal to each other.

As shown in FIG. 1, the intake ports 6 in each cylinder head 3F, 3R are formed in such a fashion that they bend upwardly as they part from the centers of their respective cylinders 4a–4f. Because of this, each of the independent intake passages 20F, 20R extend substantially perpendicularly and upwardly from the corresponding cylinders 4a–4f. Each of the independent intake pipes 15F, 15R bends in the middle thereof and extends rearwardly. The rear side collecting intake passage 21R (the first collecting intake passage) formed in the rear side surge tank 14R is arranged above the rear side bank 1R carrying the second, the fourth and the sixth cylinders 4b, 4d, 4f which communicate with said rear side collecting intake passage 21R. The front side collecting intake passage 21F (the second collecting intake passage) is arranged above the rear side independent intake passage 20R connected to said rear side collecting intake passage 21R. By this integration of the intake manifold 13, the three rear side independent intake pipes 15R, which form the three rear side independent intake passages 20R and are connected to said rear side collecting intake passage 21R, are connected integrally with the front side surge tank 14F (intake collecting part), with a common partition wall 22 therebetween.

As shown in FIG. 2, each front side independent intake pipe 15F extends substantially perpendicularly from the front side surge tank 14F and bends at the intermediate part thereof in a direction in which the front side bank 1F is shifted with respect to the rear side bank 1R (downward direction in the drawing). The location of the rear side surge tank 14R is shifted with respect to the front side surge tank 14F in the same direction as the location of the front side bank 1F is shifted with respect to the rear side bank 1R. By this shifting in location, each rear side independent intake pipe 15R extends substantially perpendicularly from the rear side surge tank 14R and bends at the intermediate part thereof in the direction in which the rear side bank 1R is shifted with respect to the front side bank 1F.

Injector fitting holes 11 are formed in the fitting parts 9a, 9b of the spacer 9 for receiving injectors 23. The injector fitting holes 11 and the fuel jetting ports 7 of each cylinder head 3F, 3R are arranged on a slant so that the center lines thereof pass the center of umbrella parts 8a of the intake valves 8 at the downstream ends of the intake ports 6. With this arrangement, fuel can be jetted from the injectors 23 to the backs of the umbrella parts 8a of the intake valves 8.

Due to slanting of said fuel jetting ports 7 and the injector fitting holes 11, each injector 23 is arranged in such a fashion that it faces the side of the opposite bank 1F, 1R. Therefore, upper end portions of opposing pairs of injectors 23 at the front side and the rear side banks 1F, 1R are close to each other. A fuel dispensing pipe 24 extends along the banks 1F, 1R and is arranged between the upper end portions of the pair of injectors 23. Each injector 23 is connected to this fuel dispensing pipe 24 so that fuel can be supplied to each injector 23 from this single fuel dispensing pipe 24.

Provided through the spacer 9 are an exhaust recirculating passage 25 through which a part of the exhaust gas flows back to the intake system and a blow-by gas passage 26 for supplying blow-by gas collected in a crank room (not shown in the drawing) below the cylinder block 2 for combustion. Said exhaust recirculating passage 25 branches away from the vertical rib 9b into each lateral rib 9c of the spacer 9 and the downstream end of each branch opens into a side of one of the ports 10 at the side thereof adjacent the corresponding injector fitting hole 11. Similarly, the blow-by gas passage 26 branches outwardly below the exhaust recirculating passage 25 into each lateral rib 9c from the vertical rib 9d and the downstream ends of the branches open respectively into the sides of the ports 10 at the side thereof adjacent the injector fitting hole 11. In FIG. 1, reference numeral 29 designates an engine compartment hood for the passenger car.

In the above embodiment, at low engine speeds, the switchover valve 18 is shut so as to block the communicating pipe 16 of the intake manifold 13. By this closing of the switchover valve 18, the front side and the rear side collecting intake passages 21F, 21R in the surge tanks 14F, 14R communicate with each other in the collecting pipe 17 at the upstream side. In this state, the intake resonance frequency generated among cylinders 4a, 4c, 4e (or 4b, 4d, 4f) in the bank 1F (or 1R) becomes low. Thus, a resonance effect is displayed at low engine speeds so that the intake air is supercharged. That is, after the negative pressure waves of intake generated near each of the intake ports 6 at the initial stage of the intake process of cylinders 4a, 4c, 4e (or 4b, 4d, 4f) in the bank 1F (or 1R) are transmitted to each intake port 6, each port 10 of the spacer 9, and the independent intake passage 20F (or 20R) in each independent intake pipe 15F (or 15R), they reflect at the joining part in the collecting pipe 17 and are inverted into positive pressure waves. These positive pressure waves then return to the intake ports 6 of the cylinders 4a, 4c, 4e, (or 4b, 4d, 4f) of the bank 1F (or 1R). Because the pressure waves are transmitted reciprocatively between the respective cylinder 4a, 4c, 4e (or 4b, 4d, 4f) and the collecting pipe 17. The waves of the intake air become resonant such that large amplitude resonant pressure waves are generated. These pressure waves supercharge the intake air by forcing it into the intake port 6.

On the other hand, when the engine 1 is run at high speeds, said switchover valve 18 is opened and both collecting intake passages 21F, 21R communicate with each other through the communicating pipe 16. In this state, since the transmitted negative pressure waves of intake air are reflected in the communicating pipe 16 and are inverted into positive pressure waves therein, the resonance frequency rises. Thus, the intake air becomes resonant at a higher frequency such that the intake air can be resonance-supercharged effectively even at a high engine speeds.

Since the independent intake passages 20F, 20R are relatively long, at high engine speeds negative pressure waves of intake air are generated near each of the intake ports 6 at the initial stage of the intake process of each of the cylinders 4a 4c, 4e (or 4b, 4d, 4f) of the bank 1F (or 1R) and are inverted into positive pressure waves, which act on the ending stage of the intake process of the same respective cylinder 4a, 4c, 4e (or 4b, 4d, 4f). This causes supercharging of the intake air due to the inertia of the intake air.

In this case, each of the independent intake passages 20F, 20R is equal in length to the others and extend substantially perpendicularly and upwardly from each respective cylinder 4a–4f. The rear side collecting intake passage 21R in the rear side surge tank 14R is arranged directly above the rear side bank 1R and the front side collecting intake passage 21F is arranged above the rear side independent intake passages 20R. Because of this arrangement, the degree of bending of the rear side independent intake passages 20R, corresponding to the rear side bank 1R above which both collecting intake passages 21F, 21R are arranged, becomes comparatively small. On the other hand, each rear side independent intake passage 20R corresponding to the rear side bank 1R is arranged so that it is overlapped by the front side collecting intake passage 21F, and so that the front side collecting intake passage 21F is positioned relatively low. Also, the degree of bending of the front side independent intake passages 20F is increased to be nearly equal to that of the rear side independent intake passages. Therefore, even with the construction in which each independent intake passage 20F, 20R is relatively long and in which both collecting intake passages 21F, 21R are arranged above the rear side bank 1R, it is possible to make the degrees of bending of both independent intake passages 20F, 20R substantially equal so as to equalize the air intake efficiencies among the cylinders 4a–4f of both banks 1F, 1R.

The independent intake pipes 15R which respectively form the rear side independent intake passages 20R connected to the rear side collecting intake passage 21R are formed integrally with the front side surge tank 14F with a common partition wall 22 therebetween. Therefore, it is possible to position the front side collecting intake passage 21F relatively low and also to make the intake system and even the engine 1 as a whole lower in height and more compact. Moreover, the rear side of the engine is higher than the front side due to the arrangement of both surge tanks 14F, 14R at the rear side of the engine. This is advantageous because it corresponds to the normal rearward inclination of the engine compartment hood. Thus, the height of the hood 29 can be set relatively low in height. Also, because each independent intake pipe 15F, 15R is made integral with the surge tanks 14F, 14R, the strength of the intake system is increased.

The rear side surge tank 14R is shifted in location with respect to the front side surge tank 14F in the same direction as the direction in which the front side bank 1F is shifted in location with respect to the rear side bank 1R. Due to this shifting in location, the distances from the throttle body 28 to the front side surge tank 14F and to the rear side surge tank 14R are equal. Therefore, dividing of the intake air to the cylinders 4a–4f of both banks 1F, 1R is improved and the resonance tuning of both banks 1F, 1R is in conformity. Thus, the output of the engine 1 can be improved and the noise, vibration, etc. therefrom can be reduced.

Moreover, each of the rear side independent intake pipes 15R extends substantially perpendicularly from the rear side surge tank 14R and then bends at the intermediate part thereof in the direction in which the rear side bank 1R is shifted with respect to the front side bank 1F. This bending provides for significant space around each plug hole 5 of the cylinder head 3R in the rear side bank 1R. Therefore, even if the engine 1 is of the DOHC type in which the ignition plug is arranged at the central part of each cylinder head 3F, 3R there is sufficient space to service the spark plugs.

Each front side independent intake pipe 15F extends substantially perpendicularly from the front side surge tank 14F and then bends at the intermediate part thereof in the direction in which the front side bank 1F shifts with respect to the rear side bank 1R. Therefore, the positions of the front side independent intake pipes 15F do not interfere with the fitting bolts 12 for securing the spacers to the cylinder heads 3F, 3R of the engine 1. Thus, servicing and installation of the intake manifold 13 are made easier.

As the cylinder heads 3F, 3R are connected integrally with each other by the spacer 9, the cylinder banks 1F, 1R are reinforced. Thus, deformation due to relative thermal expansion of the cylinder banks 1F, 1R is controlled and generation of cracks is effectively prevented.

Since the upper surface of each port forming part 9e of the spacer 9 is planar, when attaching the intake system to the engine 1, it is only necessary to attach the spacer 9 to the cylinder heads 3F, 3R with the bolts 12, to position the intake manifold 13 therefore and to fasten the independent intake pipes 15F, 15R to the port forming part 9e of the spacer 9 with the bolts 19. Thus, attachability of the intake system is improved.

The exhaust recirculating passage 25 and the blow-by gas passage 26 are formed in the spacer 9. Exhaust gas for recirculation and blow-by gas are supplied to each of the independent intake passages 20F, 20R through the passages 25, 26 in the spacer 9. Therefore, no oil from the blow-by gas or water from the exhaust gas will collect in the surge tank as would be the case if these gases were supplied to the intake passages in the surge tank. Thus, dividing of both gases to the cylinders 4a–4f is enhanced.

Moreover, as the exhaust recirculating passage 25 is formed at the upper side of the spacer 9 and the blow-by gas passage 26 is arranged at the underside thereof, there is no danger that oil in the blow-by gas will flow backwards into the exhaust recirculating passage 25.

There is provided one fuel dispensing pipe 24 between both banks 1F, 1R through which fuel is supplied to the injectors 23 corresponding to the cylinders 4a–4f of both banks 1F, 1R. Thus, the space between the banks 1F, 1R is used more effectively than in the case where a fuel dispensing pipe is provided for each of the cylinders 4a–4f of each bank 1F, 1R.

Because the independent intake pipes 15F, 15R corresponding to each cylinder 4a–4f are arranged upwardly from the injectors 23 and the six independent intake pipes 15F, 15R corresponding to the cylinders 4a–4f are divided into two groups of three, the injectors are better exposed to the wind during travel so that heat radiation is improved as compared with the case where six independent intake pipes are all arranged at the center of both banks 1F, 1R. As a result, even when the engine 1 is restarted after it was stopped in a warmed state, evaporation of fuel from the injectors 23 is reduced and engine starting is improved.

As each port 6 bends upwardly as it parts from the cylinders 4a–4f and the injectors 23 extend from the cylinder sides, fuel jetted from the injectors 23 hits the back of the umbrella parts 8a of the intake valves 8 and the distance between the injectors 23 and the umbrella parts 8a of the intake valves 8 is increased. Thus, evaporation/atomization of the jetted fuel is enhanced.

Figure 3:
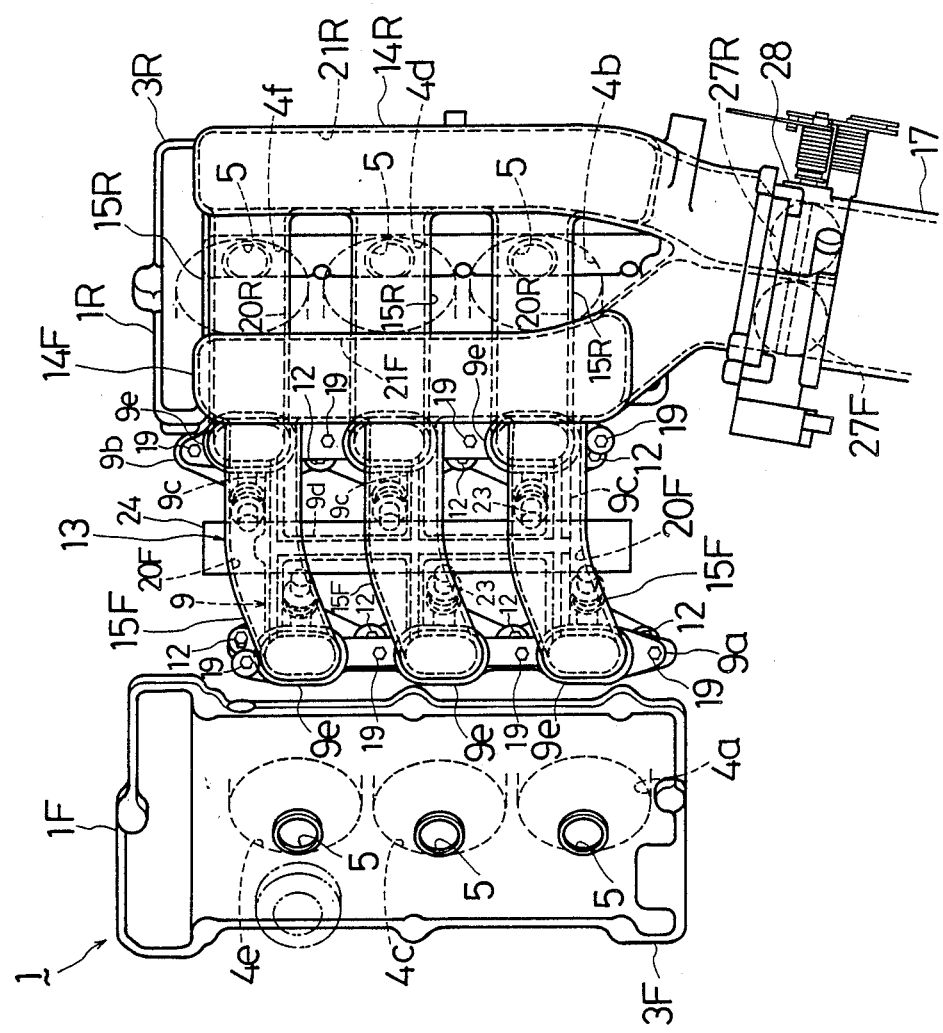
FIG. 3 is similar to FIG. 2, but shows a second embodiment of the present invention.

FIG. 3 shows a second embodiment of the present invention. Like reference numeral are given to the same parts as those in FIG. 2 and detailed explanation of them is omitted. In this embodiment, each of the rear side independent intake pipes 15R (rear side independent intake passage 20R) is rectilinear as seen from above.

Although the rear side independent intake pipes 15R are rectilinear as seen from above, they have a relatively large bend along the direction normal to the sheet, and the front side independent intake pipe 15F bends as seen from above, but has a degree of bending which is relatively small. Therefore, intake resistance in the front side and the rear side independent intake passages 20F, 20R, formed respectively in the independent intake pipes 15F, 15R, are again equal and irregularity of the intake resistance is reduced.

In each of the above embodiments, the collecting intake passages 21F, 21R are formed in the surge tanks 14F, 14R. However, the present invention can alternatively be applied to an intake system in which the collecting intake passages are formed in cylindrical shapes of small capacity to obtain actions and effects similar to the above embodiments.

It goes without saying that the present invention is applicable to various V-type engines, as well as to DOHC transversely mounted V-type 6-cylinder engines.

In each of the above embodiments, the upstream sides of both surge tanks 14F, 14R meet each other at the collecting pipe 17 upstream of the throttle body 28. Alternatively, a communicating part which communicates both collecting intake passages 21F, 21R with each other can be provided downstream of the throttle valves 27F, 27R and it is possible to reduce the number of throttle valves to only one and an intake passage can be branched from the downstream side of the throttle valve.

The third embodiment of the present invention will be described below, with reference to FIG. 4–FIG. 14.

Figure 4:
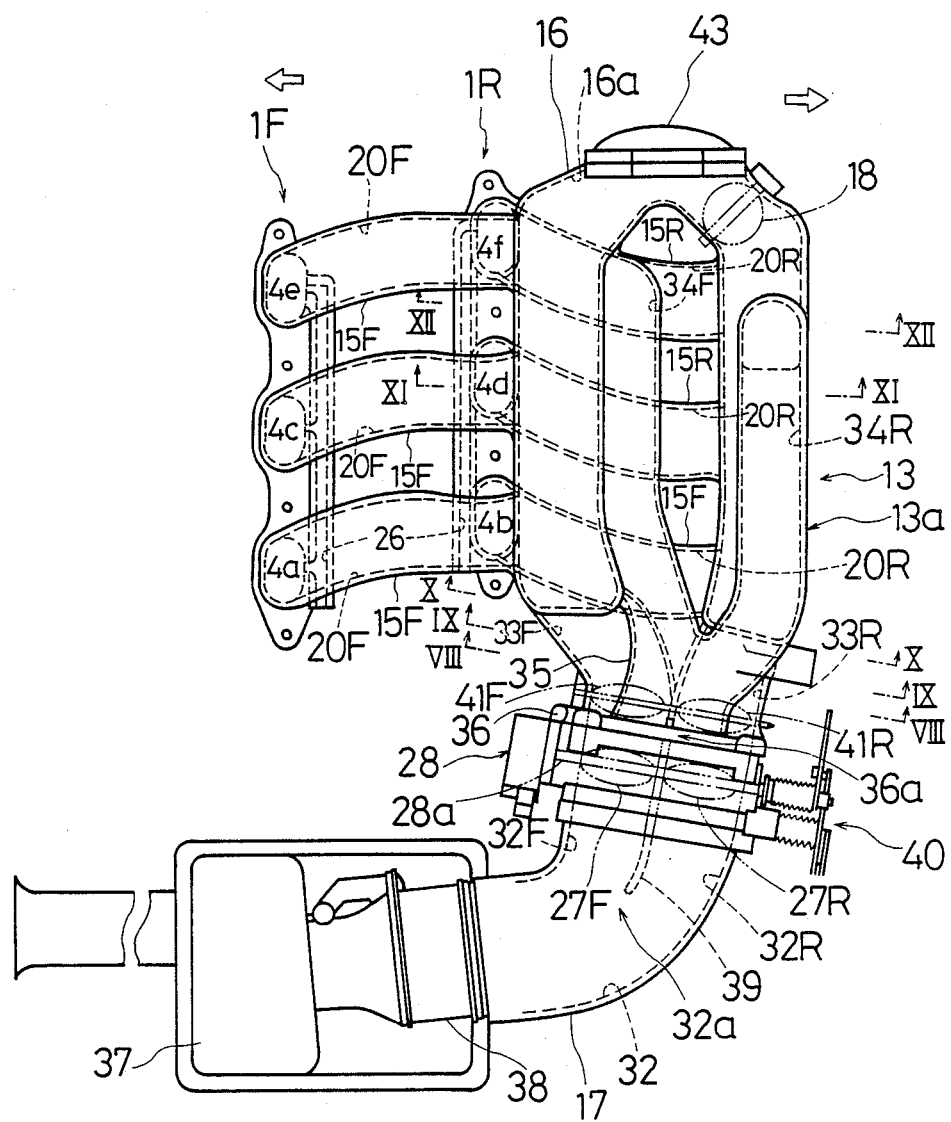
FIG. 4 is a plan view of an intake system for a V-type engine according to a third embodiment of the present invention.
Figure 5:
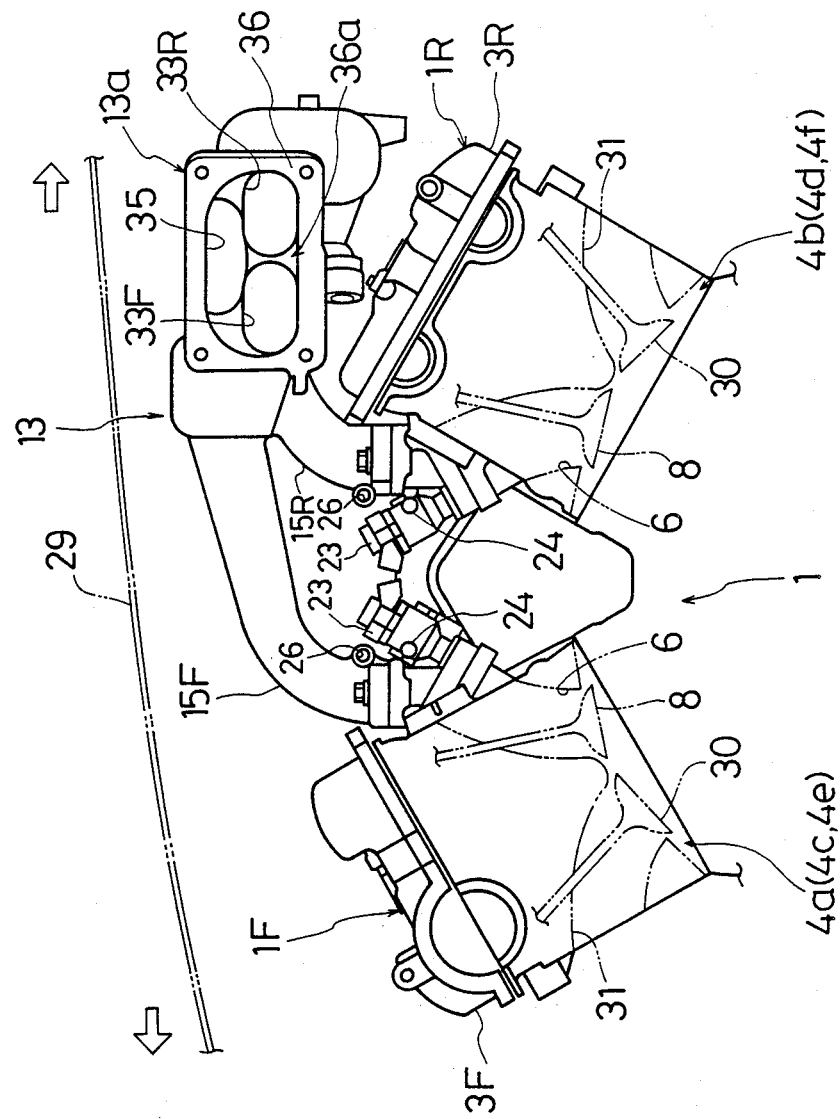
FIG. 5 is similar to FIG. 1, but shows a V-type engine according to the third embodiment.

As shown in FIG. 4 and FIG. 5, in the 6-cylinder transversely mounted V-type engine 1 (to be fired in the order of the first to the sixth cylinders 4a–4f), while the first the third and the fifth cylinders 4a, 4c, 4e, which are not in sequence in the firing order, are arranged in the front side cylinder bank 1F, as seen in the longitudinal direction of the vehicle body, the second, the fourth and the sixth cylinders 4b, 4d, 4f, which are also not in sequence in the firing order, are arranged in the rear side cylinder bank 1R.

When the intake valve 8 opens, the first cylinder 4a, for example, inhales intake air from the corresponding front side independent intake passage 20F into the combustion chamber of the cylinder 4a via the intake port 6. The intake air is compressed by a piston (not shown in the drawing) and is ignited by one of the spark plugs. When an exhaust valve 30 is opened, combustion gas is exhausted to an independent exhaust passage 31. In the front side independent intake passage 20F, the injector 23 which jets fuel into the intake port 6 is provided slightly upstream of the intake port 6, with its jet orifice slanting toward the downstream side thereof. Fuel is supplied to the corresponding injector 23 through the fuel dispensing pipe 24. Blow-by gas is introduced into the combustion chamber of the cylinder 4a through the blow-by gas passage 26. The operation of the second through the sixth cylinders 4b–4f is similar.

In the engine 1, both banks 1F, 1R are disposed laterally in the engine compartment beneath the hood 29 with a gentle slope upward toward the rear side of the vehicle. The intake manifold 13 connected to a common intake passage 32 (refer to FIG. 4) by way of the throttle body 28 is arranged between an upper end portion of the cylinder head 3F of the rear side bank 1R and the hood 29. Because the rear side of the hood 29 is relatively high, is spaced above the cylinder head 3R and is well secured in the vertical direction, the intake manifold 13 can be disposed without interference with the hood 29. This intake manifold 13 is composed by a manifold proper 13a and independent intake passage pipes 15F, 15R. This manifold proper 13a, as described later, acts as a volume part for stabilizing supply of intake air and also acts as a resonance passage for effectively generating a resonance effect at middle/low engine speeds. At high engine speeds, the manifold proper 13a acts as a pressure reversing part for effectively generating an inertia effect. Formed in each independent intake passage pipe 15F, 15R, are independent intake passages 20F, 20R of substantially equal lengths which connect the manifold proper 13a and the intake ports 6 of the cylinders 4a–4f.

Provided in the manifold proper 13a are a high speed front side intake passage 33F for high engine speeds extending transversely of the car, a low speed front side intake passage 34F for low engine speeds, a rear side intake passage 33R extending almost parallel with the low speed front side intake passage 34F and at a position slightly lower than the high speed front side intake passage 33F, and a low speed rear side intake passage 34R for low engine speeds arranged along the upper surface of the high speed rear side intake passage 33R.

The high speed front side and rear side intake passages 33F, 33R are formed in the surge tanks and have comparatively large cross sectional areas. These passages are formed to be relatively large volume parts.

As will be described later, the downstream end portion of the high speed front side intake passage 33F and that of the high speed rear side intake passage 33R, along with the communicating passage 16a of the U-shaped communicating pipe 16 together form a U-shape intake passage (refer to FIG. 4). Provided in the communicating passage 16a is the communicating passage switchover valve 18 which is opened and shut according to the working conditions of the engine 1.

The downstream end portion of the low speed front side intake passage 34F is connected to the high speed front side intake passage 33F from the side and the downstream end portion of the low speed rear side intake passage 34R is connected to the high speed rear side intake passage 33R from above. The upstream end portions of the high speed front side and rear side intake passages 33F, 33R open into the flange part 36, and the upstream end portions of the low speed front side and rear side intake passages 34F, 34R open into the flange part 36 by way of the low speed common intake passage 35 (refer to FIG. 4).

The upstream end portions of the front side independent intake passages 20F are connected to the front side of the high speed front side intake passage 33F. They then extend substantially in a straight line while gently descending, but then curve downwardly and connect to the intake part 6 of the corresponding cylinder of the front bank 1F. On the other hand, the upstream end portion of the rear side independent intake passage 20R is connected to the front side of the high speed rear side intake passage 33R and extends forwardly therefrom as it curves to form a convex shape and connects into the corresponding intake port 6 of the rear side bank 1R. It is so designed that the front side independent intake passages 20F and the rear side independent intake passages 20R are of the same effective length. However, since the rear side independent intake passage 20R is shorter than the front side independent intake passage 20F along the horizontal direction, it is necessary to set the radius of curvature at the bent portion of the rear side independent intake passages 20R smaller than that of the front side independent intake passages 20F so as to equalize the effective lengths (i.e. the intake channel lengths) of both. Thus, intake resistance will be slightly increased.

A more detailed explanation will now be set forth with respect to composition of each part of the intake system.

As shown in FIG. 4, for the purpose of utilizing space above the engine 1 effectively, an air cleaner 37 for removing floating dust in the intake air and an airflow meter 38 for detecting the quantity of intake air are provided in the common intake passage 32 which is formed with an oblong cross section. In elevation, the common intake passage 32 appears to extend in a substantially straight line, from its upstream end portion to downstream of the airflow meter 38, in the longitudinal direction of the vehicle (i.e. in the direction of disposition of both banks 1F, 1R. In a plan view, the common intake passage 32 curves about 90° toward the left (as seen front above) at a bending part 32a, which is slightly downstream from the airflow meter 38, and then extends along the direction of both high speed intake passages 33F, 33R. The common intake passage 32 is partitioned into a front side branch intake passage 32F and a rear side branch intake passage 32R by a rib 39 extending from the latter half of the bending part 32a to the downstream side of the throttle body 28. Although the common intake passage 32 is relatively narrow in the vertical direction the rib 39 provides it with sufficient strength.

As intake air flowing in the common intake passage 32 turns about 90° when it passes through the bending part 32a, it flows more at the outer circumferential side of the bending part 32a due to its inertia and centrifugal force. Therefore, more intake air flows into the rear side branch intake passage 32R which opens into the outer circumferential side of the bending part 32a than into the front side branch intake passage 32F which opens into the inner circumferential side of the bending part 32a. Since the rear side independent intake passages 20R have a smaller radius of curvature than do the front side independent intake passages 20F as stated before, it has a larger intake resistance than the front side independent intake passage 20F. Since more intake air flows into the rear side branch intake passage 32R than the front side branch intake passage 32F as stated above, but the intake resistance is also greater for the rear side branch intake passage 32R, the quantity of intake air for the front side independent intake passage 20F and that for the rear side independent intake passage 20R is equalized. Thus, charging efficiencies at each cylinder 4a–4f are equalized and output of the engine 1 is improved.

The downstream end portions of the front side and the rear side branch intake passages 32F, 32R are connected to a flange part 36 of the manifold proper 13a by way of the throttle body 28. Provided in this throttle body 28 are the front side throttle valve 27F for adjusting the quantity of intake air of the front side branch intake passage 32F and the rear side throttle valve 27R for adjusting the quantity of intake air of the rear side branch intake passage 32R. By thus arranging the throttle valves 27F, 27R in a lateral direction (two-valve system), the throttle body 28 is compact in the vertical direction. These front side and rear side throttle valves 27F, 27R are mounted to the same valve axis 28a in the throttle body 28 and open and shut simultaneously according to the working of an accelerator pedal by way of a link mechanism 40 which provides a non-linear opening characteristic.

Figure 7:
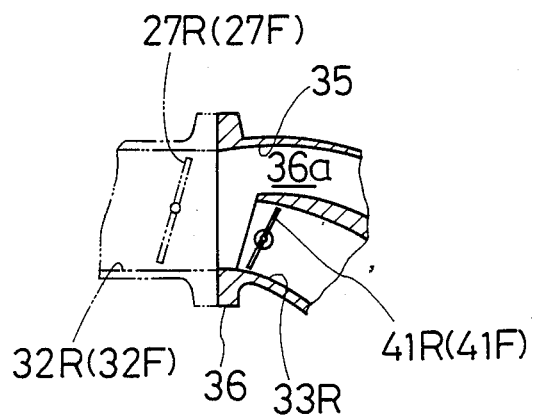
FIG. 7 is a cross section, taken along the line VII—VII in FIG. 6.
Figure 8:
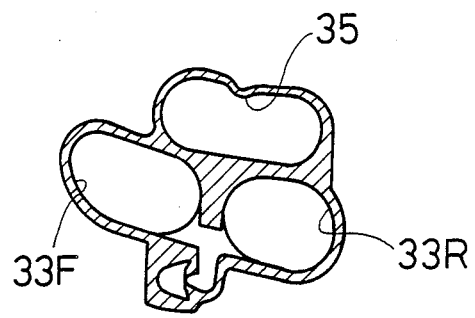
FIG. 8 is a cross section, taken along the line VIII—VIII in FIG. 4.
Figure 9:
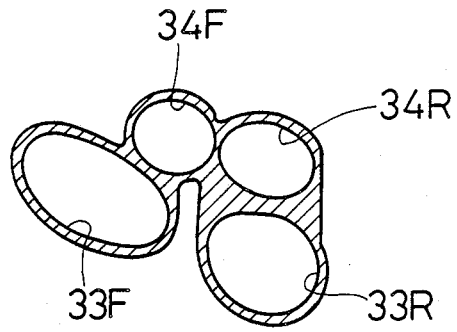
FIG. 9 is a cross section, taken along the line IX—IX in FIG. 4.
Figure 10:
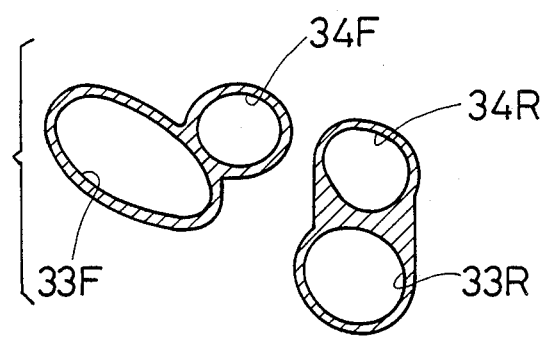
FIG. 10 is a cross section, taken along the line X—X in FIG. 4.

The front side intake passage 32F and the rear side intake passage 32R converge into a collecting part 36a in the flange part 36 of the manifold proper 13a (refer to FIG. 7). This collecting part 36a is provided as a pressure reversing part for a pressure wave when utilizing the resonance effect, the resonance effect being created by obtaining a state of substantially equal pressure by way of interfering action between an intake wave on the front side bank 1F and an intake wave on the side of the rear side bank 1R. As will be described later, at the position immediately downstream of the flange part 36, the induction system branches into the high speed front side intake passage 33F, the high speed rear side intake passage 33R and the low speed common intake passage 35. The upstream end portions of the high speed front side and rear side intake passages 33F, 33R are formed flat (or compact in the vertical direction). The upstream end portions of the high speed front side and rear side intake passages 33F, 33R open adjacent to each other at a lower half of the flange part 36 which has a rectangular cross section. The low speed common intake passage 35 opens at an upper half of the flange part 36, close to the high speed front side and rear side intake passages 33F, 33R (refer to FIG. 5). Thus, the induction system around the flange part 36 is very compact with respect to both the vertical and lateral directions.

The high speed front side and rear side intake passages 33F, 33R and the low speed common intake passage 35 which open at the flange part 36 are, at the position near the flange part 36 (near the upstream end portion), arranged substantially midway between the remaining portions of the high speed front side intake passage 33F and the high speed rear side intake passage 33R with respect to the lateral direction and also with respect to the vertical direction. Therefore, at the position near the upstream end portion, the high speed front side intake passage 33F and the high speed rear side intake passage 33R are formed symmetrically and with the same shape. As a result, the intake system around the flange part 36 is formed compactly. Furthermore, intake resistances of the high speed front side and rear side intake passages 33F, 33R are equalized and output of the engine 1 is stabilized. Although the low speed common intake passage 35 is branched, at the position slightly downstream from the collecting part 36a, into the low speed front side intake passage 34F and the low speed rear side intake passage 34R, compactness and equalization of intake resistance can likewise be attained for the low speed front side and rear side intake passages 34F, 34R.

As compared with the cross sectional areas of the low speed front side and rear side intake passages 34F, 34R, those of the high speed front side and rear side intake passages are large so that a large quantity of intake air can be supplied at high engine speeds. While the downstream end portion of the low speed front side intake passage 34F is connected, at a position slightly downstream from the collecting part 36a, to the rear side of the high speed front side intake passage 33F, the downstream end portion of the low speed rear side intake passage 34R is connected to the upper side of the high speed rear side intake passage 33R. Therefore, at low engine speeds intake of the low speed front side and rear side intake passages 34F, 34R flows into the high speed front side and rear side intake passages 33F, 33R, respectively, where it is dispersed and is supplied to the corresponding cylinder through the independent intake passages 20F, 20R.

While the independent front side intake passages 20F corresponding respectively to the first, the third and the fifth cylinders 4a, 4c, 4e of the front side bank 1F are connected to the front side of the high speed front side intake passage 23F, the independent rear side intake passages 20R corresponding respectively to the second, the fourth and the sixth cylinders 4b, 4d, 4f of the rear side bank 1R are connected to the front side of the high speed rear side intake passage 33R. As stated before, the positional relationship between the high speed front side intake passage 33F and the high speed rear side intake passage 33R and the shape of the independent intake passages 20F, 20R are such that each independent intake passage 20F of the front side bank, 1F and each independent intake passage 20R of the rear side bank 1R have the same effective length (the same intake channel length).

At the position immediately downstream from the collecting part 36, the high speed front side and rear side intake passages 33F, 33R are provided with front side and rear side switchover valves 41F, 41R, respectively, for opening and shutting said passages. As will be explained later, these front side and rear side switchover valves 41F, 41R are so designed that they are shut when the engine speed is below a designated value in the range in which a resonance effect should be utilized.

Figure 6:
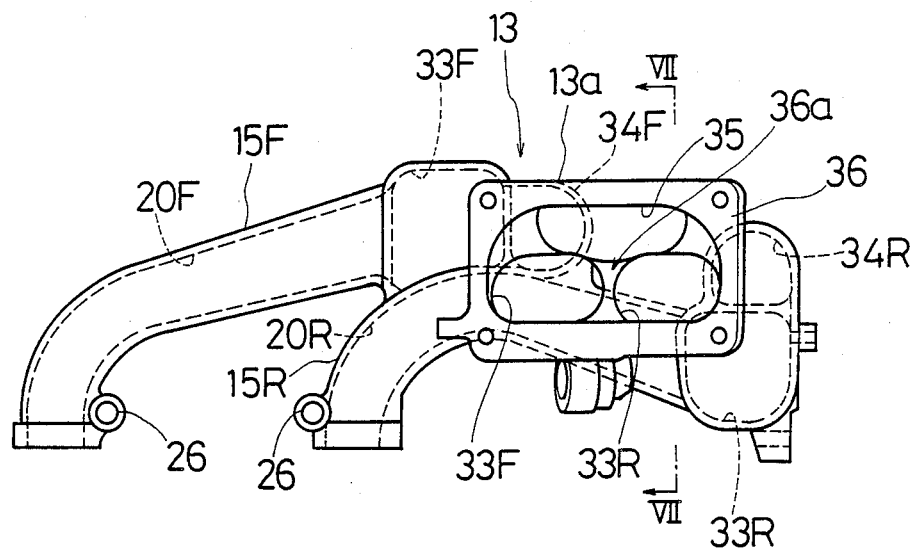
FIG. 6 is a side view of a part located downstream of a flange part of the intake system shown in FIG. 4.

FIG. 6 shows the intake manifold 13, as seen from the upstream side of the flange part 36 toward the downstream side of the manifold. FIG. 7 is a cross section, taken along the line VII—VII in FIG. 6. As shown in FIG. 6 and FIG. 7, the high speed front side intake passage 33F and the high speed rear side intake passage 33R are branched and extended downstream from a lower half of the flange part 36 (collecting part 36a). The low speed common intake passage 35 is branched and extended downstream from an upper half of the collecting part 36a.

Referring back to FIG. 4, the high speed front side intake passage 33F and the high speed rear side intake passage 33R extend downstream from the downstream side of the flange, part 36, gradually diverge right and left, and at the position where they connect (via the independent intake passages) to the first cylinder 4a and the second cylinder 4b, they begin running in parallel with each other. The parts of the high speed intake passages 33R, 33F which extend in parallel with each other (hereinafter referred to as the parallel parts), are positioned such that the high speed front side intake passage 33F is slightly higher than the high speed rear side intake passage 33R (refer to FIG. 11). From just downstream of the collecting part 36a, the low speed front side intake passage 34F and the low speed rear side intake passage 34R extend downstream and gradually diverge right and left. Then, at the parallel parts thereof, the front side of the low speed front side intake passage 34F has a planar side wall which forms a common wall with the high speed front side intake passage 33F. Thus, both passages are formed integrally.

In order to show the positional relationships between the high speed front side and rear side intake passages 33F, 33R and the low speed front side and rear side intake passages 34F, 34R, as well as their respective cross sectional shapes, cross sections taken along the line VIII—VIII, the line IX—IX, the line X—X, the line XI—XI, and the line XII—XII in FIG. 4 are shown in FIG. 8, FIG. 9, FIG. 10, FIG. 11 and FIG. 12, respectively. Each intake passage 33F, 33R, 34F, 34R is divided into the front side and the rear side from the flange part 36 and gradually diverge toward its parallel part.

Figure 11:
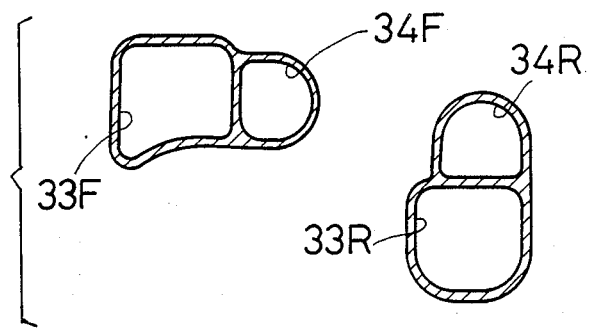
FIG. 11 is a cross section, taken along the line XI—XI in FIG. 4.
Figure 12:
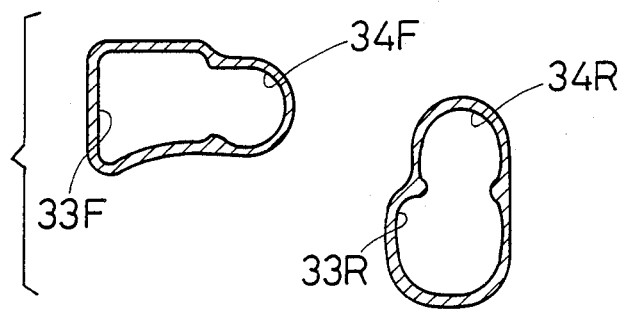
FIG. 12 is a cross section, taken along the line XII—XII in FIG. 4.

As shown in FIG. 11, at the parallel part, the cross sectional areas of the low speed front side and rear side intake passages 34F, 34R are smaller than those of the high speed front side and rear side intake 33F, 33R. As will be described later, due to this difference the intake channel lengths of the low speed front side and rear side intake passages 34F, 34R are longer than those of the high front side and rear side intake passages 33F, 33R. The cross sectional shape of the high speed front side intake passage 33F has a smaller width than height.

The high speed front side intake passage 33F is arranged at a position in which its undersurface is almost on the same level as the upper surface of the high speed rear side intake passage 33R. As stated before, the low speed front side intake passage 34F is formed integrally with the high speed front side intake passage 33F by having the rear side wall of the passage 33F in common with the front side wall of the passage 34F. In a similar manner, the low speed rear side intake passage 34R is formed integrally with the high speed rear side intake passage 33R by having the upper wall of the passage 33R in common with the lower wall of the passage 34R. Thus, these passages are very compact in shape and have a reduced height. Additionally, the low speed front side intake passage 34F and the low speed rear side intake passage 34R are arranged at substantially the same height.

Figure 13:
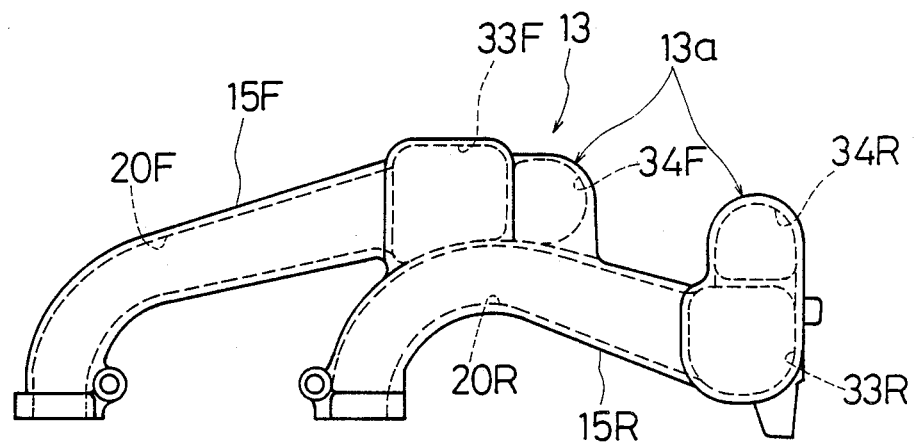
FIG. 13 shows an elevation view of an intake passage for use at high engine speeds, an intake passage for use at low engine speeds and an independent intake passage for the embodiment shown in FIG. 4.

As shown in FIG. 13, because the high speed front side intake passage 33F is integral with the upper wall of the rear side independent intake passages 20R, the intake system is made more compact and the strength thereof is increased.

Referring back to FIG. 4, the downstream end portion of the high speed front side intake passage 33F and the downstream end portion of the high speed rear side intake passage 33R are connected to each other by the U-shaped communicating passage 16a. The communicating passage switchover valve 18 is provided near the position where the high speed rear side intake passage 33R joins the communicating passage 16a. As will be explained later, this communicating passage switchover valve 18 is opened to form a volume part (pressure reversing part) when the inertia effect is utilized at the designated high engine speeds.

Figure 14:
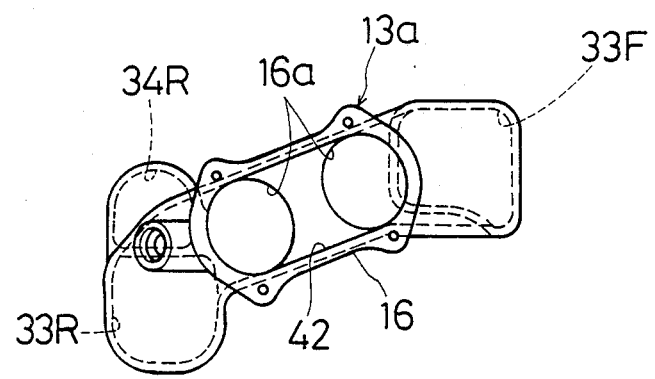
FIG. 14 is a side view of a communicating passage with a lid member removed, as viewed from the downstream side.

As shown in FIG. 14, an opening part 42 is formed at the curved part (bottom part of the U-shape) of the downstream end portion and as shown in FIG. 4, this opening part 42 is normally kept closed by a plastic lid member 43. This opening part 42 is relatively large so that a valve body of the communicating passage switchover valve 18 can easily be inserted in or removed from it during assembly, repair, cleaning or the like of the high speed front side and rear side intake passages 33F, 33R.

The supercharging operation for the above construction will now be described reference to FIG. 4.

At the designated high engine speeds for which an inertia effect should be utilized, the communicating passage switchover valve 18 and the front side and rear side switchover valves 41F, 41R are all opened. At this time, the high speed front side and rear side intake passages 33F, 33R communicate with each other by way of the communicating passage 16a and form a volume part having a fairly large volume. This volume part acts as a pressure wave reversing part. In each of the cylinders 4a-4f, when the intake valve 8 is opened, negative pressure waves generated at the intake port 6 are transmitted upstream at a sonic speed through the independent intake passages 20F, 20R and are inverted into positive pressure waves at the volume part formed by communication of the high speed front side and rear side intake passages 33F, 33R. These positive pressure waves are transmitted downstream through the independent intake passages 20F, 20R and arrive at the intake port 6 immediately before the intake valve 8 is shut. These positive pressure waves introduce intake air into the combustion chamber of the cylinder such that the charging efficiency is enhanced by the inertia effect.

At the middle/low engine speeds for which a resonance effect should be utilized, the communicating passage switchover valve 18 is shut at the designated engine speed, and the front side and the rear side switchover valves 41F, 41R are opened. At this time, the high speed front side intake passage 33F and the high speed rear side intake passage 33R do not communicate with each other and no volume part is formed. With regard to each of the first, the third and the fifth cylinders 4a, 4c, 4e of the front side bank 1F, for example, negative pressure waves generated when the intake valves 8 are opened are transmitted up to the collecting part 36a by way of the independent intake passages 20F and the high speed front side intake passage 33F. At the collecting part 36, pressure waves generated from each cylinder 4a, 4c, 4e of the front side bank 1F and pressure waves generated from each cylinder 4b, 4d, 4f of the rear side bank 1R interfere with each other such that the collecting part 36 acts as a pressure equalizing part. Such pressure equalizing part also acts as a pressure reversing part for a pressure wave. Therefore, negative pressure waves generated at each cylinder 4a, 4c, 4e of the front side bank 1F and transmitted up to the collecting part 36a are inverted into positive pressure waves at the collecting part 36a and such positive pressure waves arrive at the intake port 6 of each cylinder 4a, 4c, 4e by way of the high speed front side intake passage 33F and the front side independent intake passages 20F. As such pressure waves are presented at each of the first the third and the fifth cylinders 4a, 4c, 4e of the front side bank 1F, in the high speed intake passage 33F pressure waves of large amplitude (larger than the vibrations of the pressure waves) are generated. Then, immediately before the intake valve 8 is closed, intake air is introduced into the combustion chamber of the corresponding cylinder by the resonance pressure waves such that charging efficiency is enhanced by the resonance effect. In this case, the low speed front side intake passage 34F also communicates each intake port 6 with the collecting part 36a, but since the low speed front side intake passage 34F is substantially smaller in inside diameter than the high speed front side intake passage 33F only the high speed front side intake passage 33F is effective for transmission of pressure waves and the low speed front side intake passage 34F produces substantially no effect. Supercharging of the pressure waves for the cylinders 4b, 4d and 4f of the rear side bank 1R is carried out in a similar manner by the resonance effect.

At middle/low engine speeds for which a resonance effect should be utilized, the communicating passage switchover valves 41F, 41R are shut when the engine speed reaches the designated value. At this time, since the high speed front side and rear side intake passages 33F, 33R are closed at their respective upstream sides, for each cylinder 4a, 4c, 4e of the front side bank 1F, for example, pressure waves are transmitted reciprocatively between the intake port 6 of each cylinder 4a, 4c, 4e and the branch part of the low speed intake passage 65 via the front side independent intake passages 20F, the high speed front side intake passage 33F and the low speed front side intake passage 34F. In this case, due to interference of the waves of intake air between the front side cylinders 4a, 4c, 4e and the rear side cylinders 4b, 4d, 4f, the branch part of the low speed intake passage becomes the pressure equalizing part, namely, the pressure reversing part. Thus, the transmission channel for the pressure waves becomes longer. Moreover, since the low speed front side intake passage 34F is smaller in inside diameter than the high speed front side intake passage 33F, the effective pipe length for transmission of pressure waves is made longer, the time required for reciprocative transmission of pressure waves is increased and the resonance effect is enhanced at low engine speed. Also, charging efficiency is improved.

According to this embodiment, it is possible to enhance an inertia effect and a resonance effect, to equalize charging efficiencies of each cylinder and to improve engine output.

According to the present invention, for an intake system of a V-type engine adapted to carry out supercharging by utilizing an inertia effect and a resonance effect of intake air, it is possible to improve the dividing of intake air to the cylinders of both cylinder banks, so as to keep the charging efficiencies uniform and to reduce the height of the intake system and make the intake system compact. Therefore, even if the hood of the vehicle is low, the intake system can be arranged without interfering with the hood or the hood can be designed to be positioned lower. Thus, the present invention can contribute effectively to reducing the weight of a vehicle, improving aerodynamic characteristics of the vehicle body, etc.

From the above, it can be seen that the present invention provides industrially applicable improvements for automobiles, especially with respect to adapting the shape of the intake system to correspond to the rearward inclination of the engine compartment hood.

What is claimed is:

1. An intake system for a V-type engine of a vehicle comprising:
    a first cylinder bank having a plurality of first cylinders formed therein;
    a second cylinder bank having a plurality of second cylinders formed therein;
    a plurality of first independent intake passages connected respectively to said plurality of first cylinders;
    a plurality of second independent intake passages connected respectively to said plurality of second cylinders, each of said plurality of first and second independent intake passages being of substantially equal length;
    a first collecting intake passage connected to each of said plurality of first independent intake passages and arranged directly above said first cylinder bank; and
    a second collecting intake passage connected to each of said plurality of second independent intake passages, spaced from said fist collecting intake passage and arranged directly above said plurality of first independent intake passages.

2. An intake system as recited in claim 1, wherein each of said plurality of first and second independent intake passages extends substantially perpendicularly and upwardly from the one of said plurality of first and second cylinders to which it is respectively connected.

3. An intake system as recited in claim 1, wherein said first and second cylinder banks are mounted transversely of the vehicle such that said first bank opposes said second bank along a longitudinal direction of the vehicle, said first bank being mounted rearwardly of said second bank.

4. An intake system as recited in claim 1, wherein
each of said first independent intake passages is formed by a first independent intake pipe;
said second collecting intake passage is formed by a second collecting intake part; and
said collecting intake part is connected integrally with each of said first independent intake pipes, each of which has a common partition wall with said collecting intake part.

5. An intake system as recited in claim 1, wherein
each of said first and second banks is longitudinally elongated;
said first bank is shifted longitudinally in a first direction relative to said second bank; and
said first collecting intake passage is shifted in said first direction relative to said second collecting intake passage.

6. An intake system as recited in claim 5, wherein
each of said plurality of first independent intake passages extends perpendicularly from said first bank and includes a curved portion at an intermediate portion thereof such that it shifts in said first direction relative to said first bank.

7. An intake system as recited in claim 6, wherein
each of said plurality of second independent intake passages extends perpendicularly from said second bank and includes a curved portion at an intermediate portion thereof such that it shifts in a second direction opposite said first direction relative to said second bank.

8. An intake system as recited in claim 5, wherein
each of said plurality of second independent intake passages extends perpendicularly from said second bank and includes a curved portion at an intermediate portion thereof such that it shifts in a second direction opposite said first direction relative to said second bank.

9. An intake system as recited in claim 8, wherein
each of said plurality of first independent intake passages extends perpendicularly from said first bank and is substantially linear throughout its length.

10. An intake system as recited in claim 1, further comprising
a spacer integrally connected to and between said first and second cylinder banks.

11. An intake system as recited in claim 10, wherein said spacer has a planar upper surface.

12. An intake system as recited in claim 10, further comprising
an exhaust gas recirculating passage extending through said spacer for returning a part of the exhaust gas from said engine to said intake system; and
a blow-by gas passage extending through said spacer for returning blow-by gas from a crank room of the engine to said intake system.

13. An intake system as recited in claim 12, wherein said blow-by gas passage is arranged below said exhaust gas recirculating passage.

14. An intake system as recited in claim 1, further comprising
a single fuel distribution pipe mounted between said first and second banks for distributing fuel to each of said plurality of first and second cylinders.

15. An intake system as recited in claim 14, further comprising
a plurality of fuel injectors connected respectively to said plurality of said first and second cylinders, and mounted between said first and second cylinder banks and below said single fuel distribution pipe.

16. An intake system as recited in claim 1, further comprising
a plurality of intake ports respectively connected to and bending upwardly from said plurality of said first and second cylinders, and upper portion of each of said intake ports being spaced from its respective cylinder; and
a plurality of fuel injectors respectively connected to said plurality of intake ports, each of said fuel injectors extending linearly from a side of its respective intake port.

17. An intake system as recited in claim 1, wherein
said first collecting intake passage comprises a first high speed intake passage and a first low speed intake passage which is longer than said first high speed intake passage; and
said second collecting intake passage comprises a second high speed intake passage and a second low speed intake passage which is longer than said second high speed intake passage.

18. An intake system as recited in claim 17, wherein
said first high speed intake passage is integrally connected with said first low speed intake passage; and
said second high speed intake passage is integrally connected with said second low speed intake passage.

19. An intake system as recited in claim 18, wherein
one of said first and second high speed intake passages is connected to the underside of the corresponding one of said first and second low speed intake passages, and the other of said first and second high speed intake passage is connected to a side of the corresponding one of said first and second low speed intake passages.

20. An intake system as recited in claim 19, wherein
said one of said first and second high speed intake passages is arranged lower than said other of said first and second high speed intake passages.

21. An intake system as recited in claim 20, wherein
a particular firing order is designated for said plurality of said first and second cylinders;
said plurality of first cylinders are not in sequence in said firing order; and
said plurality of second cylinders are not in sequence in said firing order.

22. An intake system as recited in claim 20, wherein
said first and second collecting intake passages have upstream and downstream ends;
a collecting part is provided for collecting said upstream ends of said first and second collecting intake passages; and
the upstream ends of said first and second low speed intake passages communicates with said collecting part downstream of the upstream ends of said first and second high speed intake passages, respectively.

23. An intake system as recited in claim 22, wherein
said collecting part is arranged at one end of said first bank.

24. An intake system as recited in claim 23, wherein a communicating passage for communicating downstream ends of said first and second collecting passages is mounted at the other end of said first bank.

25. An intake system as recited in claim 24, further comprising
a switchover valve mounted in said communicating passage for opening and closing said communicating passage; and
a high speed throttle for throttling said high speed intake passage and a low speed throttle valve for throttling said low speed intake passage are mounted in said collecting part, both of said high speed and low speed throttle valves being opened at high engine speeds, both of said high speed and low speed throttle valves being closed at low engine speeds, and said high speed throttle valve being opened and said low speed throttle valve being closed at medium engine speeds.

26. An intake system as recited in claim 1, further comprising
a common intake passage connected to both said first and second collecting intake passage for introducing intake air thereto, said common intake passage extends away from said first and second collecting intake passages in a transverse direction of the vehicle and curves to as to extend in a forward direction of the vehicle.

* * * * *